(12) United States Patent
Ostrowski et al.

(10) Patent No.: US 6,301,516 B1
(45) Date of Patent: Oct. 9, 2001

(54) METHOD FOR IDENTIFYING CRITICAL TO QUALITY DEPENDENCIES

(75) Inventors: Michael Charles Ostrowski, Glenville; Mohamed Ahmed Ali, Niskayuna; Philip Paul Beachamp, Rexford; Bijan Dorri, Clifton Park; Arlie Russell Martin, Ballston Spa, all of NY (US); Brian Douglas Lounsberry, Thiensville; Michael Solomon Idelchick, Mequon, both of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/275,985

(22) Filed: Mar. 25, 1999

(51) Int. Cl.7 ............................. G06F 19/00; G06F 17/60
(52) U.S. Cl. ............................. 700/109; 700/97; 705/7; 705/10
(58) Field of Search ............................. 700/109, 97, 83; 702/81, 84; 705/7–10

(56) References Cited

U.S. PATENT DOCUMENTS 5,278,751 * 1/1994 Adiano et al. ............................. 705/10
5,732,200 * 3/1998 Becker et al. ............................. 358/1.15

OTHER PUBLICATIONS

The House of Quality, Hauser et al, Harvard Business Review, May–Jun. 1988, pp. 63–73.

* cited by examiner

*Primary Examiner*—Paul P. Gordon
*Assistant Examiner*—Steven R. Garland
(74) *Attorney, Agent, or Firm*—Donald S. Ingraham; Douglas E. Stoner

(57) ABSTRACT

A method of generating quality matrices indicating a relationship between critical to quality characteristics and key control parameters for levels of a process. A plurality of rows of a first matrix are designated as critical to quality characteristics and a plurality of columns of the first matrix are designated as key control parameters. Each critical to quality characteristic is assigned a critical to quality weight. An interaction weight is assigned between at least one critical to quality characteristic and at least one key control parameter. A score is then generated for at least one key control parameter in response to said critical to quality weight and said interaction weight.

18 Claims, 6 Drawing Sheets

Fig. 2

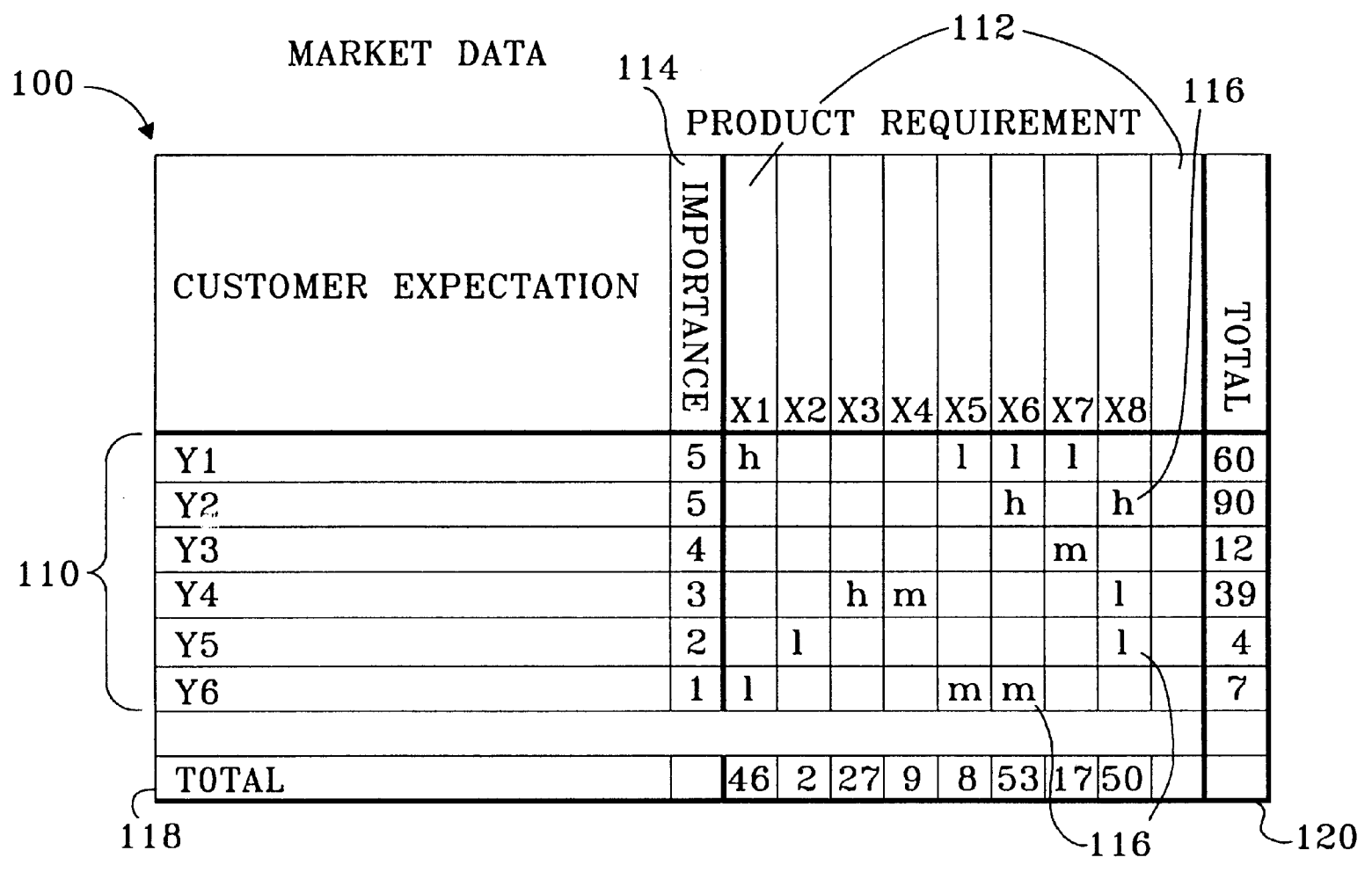

| CUSTOMER EXPECTATION | IMPORTANCE | X1 | X2 | X3 | X4 | X5 | X6 | X7 | X8 | TOTAL |
|---|---|---|---|---|---|---|---|---|---|---|
| Y1 | 5 | h | | | | l | | l | h | 60 |
| Y2 | 5 | | | | | | | m | h | 90 |
| Y3 | 4 | | | h | m | | | | | 12 |
| Y4 | 3 | | l | | | | | | l | 39 |
| Y5 | 2 | | | | | | m | | l | 4 |
| Y6 | 1 | l | | | | m | | | | 7 |
| TOTAL | | 46 | 2 | 27 | 9 | 8 | 53 | 17 | 50 | |

MARKET DATA

PRODUCT REQUIREMENT (112) — 100

| CUSTOMER EXPECTATION | IMRTANCE | x1 | x2 | x3 | x4 | x5 | x6 | x7 | x8 | TOL |
|---|---|---|---|---|---|---|---|---|---|---|
| y1 | 5 | h |  |  |  | l | l | l |  | 60 |
| y2 | 5 |  |  |  |  |  | m |  | h | 60 |
| y3 | 4 |  |  |  |  |  |  | m |  | 12 |
| y4 | 3 |  |  | h | m |  |  |  | l | 39 |
| y5 | 2 |  | l |  |  |  |  |  | l | 4 |
| y6 | 1 | l |  |  |  | m | m |  |  | 7 |
| TOTAL |  | 46 | 2 | 27 | 9 | 8 | 23 | 17 | 50 |  |

DESIGN

DESIGN FEATURES (212) — 200

| PRODUCT REQUIREMENT | IMPORTANCE | d11 | d12 | d13 | d14 | d15 | d16 | d17 | d18 | d19 | TOTAL |
|---|---|---|---|---|---|---|---|---|---|---|---|
| x1 | 5 | l |  |  |  |  |  |  |  | h | 50 |
| x2 | 1 |  | l |  | m | m |  | h |  |  | 16 |
| x3 | 3 |  |  |  |  |  |  | h |  | l | 30 |
| x4 | 1 |  |  |  |  |  | m |  |  |  | 3 |
| x5 | 1 |  |  | l |  | m |  |  | h | h | 22 |
| x6 | 3 |  |  |  | l |  | l |  |  |  | 10 |
| x7 | 3 | h |  |  |  |  |  | l |  |  | 30 |
| x8 | 5 |  |  |  | h | h | h |  | m |  | 150 |
| TOTAL |  | 32 | 1 | 1 | 53 | 51 | 53 | 30 | 18 | 72 |  |

Fig. 5A

MANUFACTURING 300

| DESIGN FEATURES | IMPORTANCE | mp1 | mp2 | mp3 | mp4 | mp5 | mp6 | mp7 | mp8 | | TOTAL |
|---|---|---|---|---|---|---|---|---|---|---|---|
| d11 | 3 | | h | | | | | h | | | 54 |
| d12 | 1 | | | | l | | | h | | | 10 |
| d13 | 1 | l | | l | | | | | | | 2 |
| d14 | 5 | | | | | | m | | l | | 20 |
| d15 | 5 | h | m | h | | | | l | | | 110 |
| d16 | 5 | | | | m | | l | | l | | 25 |
| d17 | 3 | l | | | | l | | | | | 6 |
| d18 | 2 | | l | l | l | | | m | m | | 18 |
| d19 | 5 | | | | l | | | | | | 5 |
| | | | | | | | | | | | |
| TOTAL | | 49 | 44 | 48 | 18 | 8 | 20 | 20 | 43 | | |

METHOD FOR IDENTIFYING CRITICAL TO QUALITY DEPENDENCIES

BACKGROUND OF THE INVENTION

The invention relates to a method for identifying critical to quality (CTQ) dependencies in quality function deployment. Quality function deployment (QFD) is a methodology for documenting and breaking down customer requirements into manageable and actionable details. The concept of "houses of quality" has been used to represent the decomposition of higher level requirements such as critical to quality characteristics or CTQ's (also referred to as Y's) into lower level characteristics such as key control parameters or KCP's (also referred to as X's). FIG. 1 depicts a conventional house of quality hierarchy in which high level requirements such as customer requirements are decomposed into lower level characteristics such as key manufacturing processes and key process variables within the manufacturing processes.

Each house of quality corresponds to a stage or level of the process of designing a product. At the highest level, represented as house of quality #1, customer requirements are associated with functional requirements of the product. At the next level of the design process, represented as house of quality #2, the functional requirements of the product are associated with part characteristics. At the next level of the design process, represented as house of quality #3, the part characteristics are associated with manufacturing processes. At the next level of the design process, represented as house of quality #4, the manufacturing processes are associated with manufacturing process variables. While the house of quality design process is useful, it is understood that improvements to this process are needed.

BRIEF SUMMARY OF THE INVENTION

An exemplary embodiment of the invention is directed to a method of generating quality matrices indicating a relationship between critical to quality characteristics and key control parameters for levels of a process. A plurality of rows of a first matrix are designated as critical to quality characteristics and a plurality of columns of the first matrix are designated as key control parameters. Each critical to quality characteristic is assigned a critical to quality weight. An interaction weight is assigned between at least one critical to quality characteristic and at least one key control parameter. A score is then generated for at least one key control parameter in response to said critical to quality weight and said interaction weight.

BRIEF DESCRIPTION OF THE DRAWINGS

Referring now to the drawings wherein like elements are numbered alike in the several Figures:

FIG. 2 is a quality matrix in an exemplary embodiment of the invention;

DETAILED DESCRIPTION OF THE INVENTION

Figure 1:
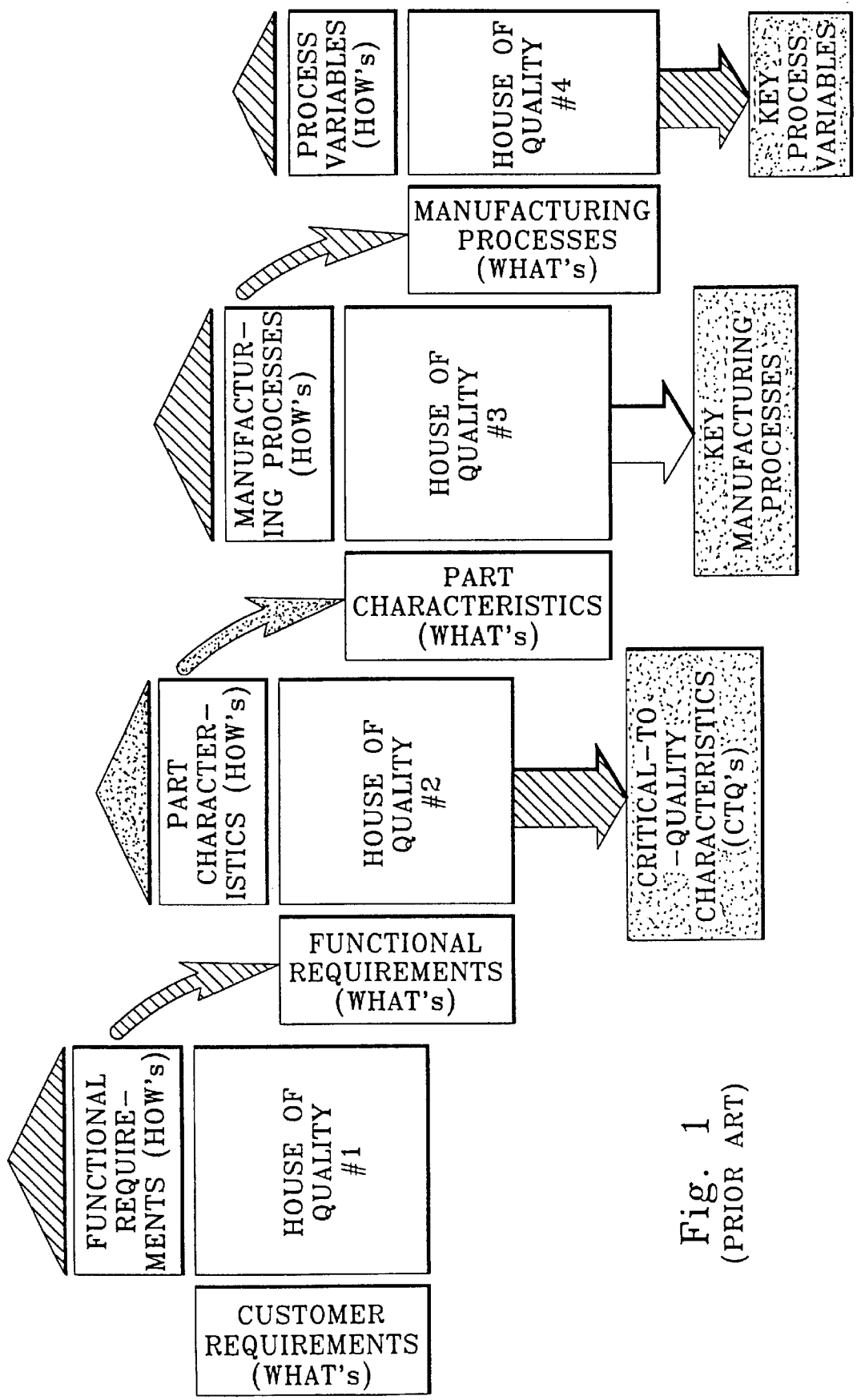
FIG. 1 illustrates the houses of quality in a conventional multi-level design process.

FIG. 2 depicts a quality matrix shown generally at 100. A quality matrix may be created for one or more levels of a multi-level design process. The quality matrices provide for tracking and assessing the relationship between critical to quality characteristics and key control parameters within a level and between levels of the design process. Critical to quality characteristics 110 are labeled y1–y6 and are arranged in rows. Key control parameters 112 are labeled x1–x8 and are arranged in columns. In the example shown in FIG. 2, the quality matrix is based on market data and the critical to quality characteristics 110 are customer expectations. The key control parameters 112 are product requirements. It is understood that other critical to quality characteristics and key control parameters may be arranged in a matrix as described below. Each critical to quality characteristic 110 and key control parameter 112 may be associated with stored data providing information for each entry (e.g., source of the data, assumptions, ranges, exceptions, etc.). The matrix 100 may be expanded by adding critical to quality characteristics and/or key control parameters.

Each critical to quality characteristic is assigned an importance or weight as shown in column 114. The critical to quality weights range from 1 to 5 (with 5 being the highest) depending on how important each critical to quality characteristic is to customer expectation. It is understood that different weights may be used. For each critical to quality characteristic 110 and each key control parameter 112, an interaction weight 116 is assigned representing the effect that a key control parameter 112 has on a critical to quality characteristic 110. The interaction weights shown in FIG. 2 are h, m, and l representing high, medium and low respectively. For example, at the intersection of critical to quality characteristic y1 and key control parameters x1, h indicates that key control parameters x1 has a high effect on critical to quality characteristic y1.

A total score is generated for each key control parameter as shown in row 118. Each interaction weight 116 may be assigned a numerical value. In the example shown in FIG. 2, low has a value of 1, medium has a value of 3 and high has a value of 9. To generate the total score for each key control parameter 112, the interaction weights 116 are multiplied by the critical to quality weights 114 along a column of the matrix and these products are summed. If a key control parameter is not assigned an interaction weight, its interaction weight is zero. For example, key control parameter x1 has a high interaction weight with critical to quality characteristic y1 and a low interaction weight with critical to quality characteristic y6. The total score for key control parameter x1 is (9·5)+(1·1)=46. The total score indicates the key control parameters that contribute the most to the critical to quality characteristics. A total column 120 contains a total score for each critical to quality characteristic 110 which may serve as a consistency check. Critical to quality characteristics having similar critical to quality weights 114 should have similar scores in total column 120. If critical to quality characteristics 110 having similar critical to quality weights 114 but significantly different values in total column 120, this indicates that a critical to quality characteristic 110 should be a key control parameter 112 or that some key control parameters are missing.

Figure 3:
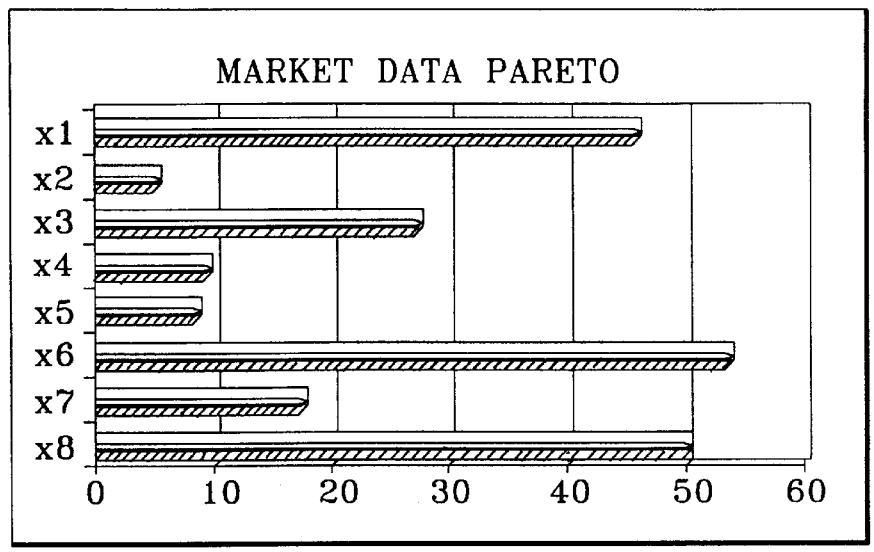
FIG. 3 is a graphical representation of scores for key control parameters.

FIG. 3 depicts a pareto graph of the total score for each key control parameter. The present invention may be implemented on a general purpose computer. The user may create matrix 100, enter the critical to quality weights 114 and the interaction weights 116 through a user interface. The process then computes the total score row 118. FIG. 3 depicts a pareto graph of the total score values that may be presented to a user to facilitate identification of key control parameters having the greatest effect on critical to quality characteristics.

Figure 4:
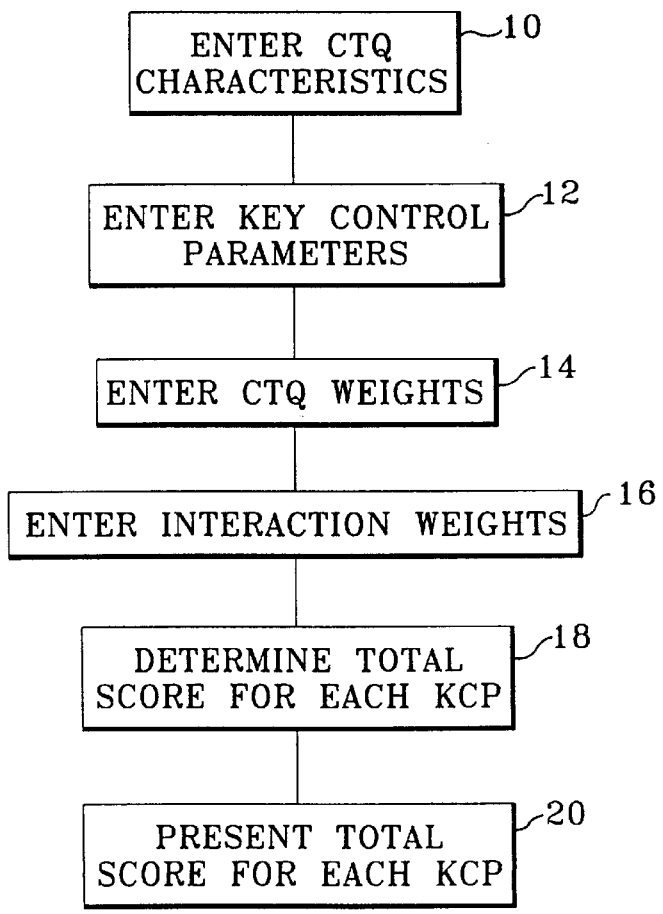
FIG. 4 is a flowchart of a process for generating a quality matrix.

FIG. 4 is a flowchart depicting the steps for creating the quality matrix shown in FIG. 2. The process begins at step 10 where the user enters the critical to quality characteristics y1–yn. Flow proceeds to step 12 where the user enters the key control parameters x1–xn. At step 14, the critical to quality weights 114 are entered and at step 16, the interaction weights 116 are entered for each combination of critical to quality characteristics and key control parameters. At step 18, the total score 118 for each key control parameter is determined as described above. At step 20, the total scores for each key control parameter are presented to the user either numerically as shown in FIG. 2 or graphically as shown in FIG. 3.

Figure 5B:
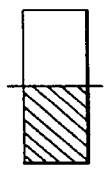
FIG. 5 depicts a hierarchy of quality matrices.

The process of creating a quality matrix may be performed for multiple levels of the design process. FIG. 5 depicts a plurality of quality matrices each corresponding to one level of a hierarchical design process. Matrix 100 in FIG. 5 is similar to matrix 100 in FIG. 2 and is based on market data. Matrix 200 uses the key control parameters 112 from matrix 100 as the critical to quality characteristics 210. Matrix 200 is directed to product design and associates the product requirements represented by critical to quality characteristics 210 with deign features represented by key control parameters 212. Matrix 200 includes critical to quality weights 214 and interaction weights 216 similar to those described above with reference to FIG. 2. A total score 218 is determined for each key control parameter 212 as described above.

When there exists a higher level matrix, step 14 of entering the critical to quality weights 216 may be performed automatically by the system based on the total scores 118 from prior matrix 100. The total score 118 from matrix 100 indicates the importance of the critical to quality characteristics 210. To determine critical to quality weights 214, the total score 118 for each critical to quality characteristic 210 may be compared to a first threshold and a second threshold. Scores equal to or exceeding the second threshold are assigned an importance of 5. Scores equal to or below the first threshold are assigned an importance of 1. Scores between the first and second threshold are assigned an importance of 3. In addition, the scores 118 may be normalized by dividing each score by the maximum score.

Quality matrix 300 is directed to product manufacturing and associates the design features represented by critical to quality characteristics 310 with manufacturing processes represented by key control parameters 312. Matrix 300 uses the key control parameters 212 from matrix 200 as the critical to quality characteristics 310. Matrix 300 includes critical to quality characteristic weights 314 and interaction weights 316 similar to those described above with reference to FIG. 2. A total score 318 is determined for each key control parameter as described above. The critical to quality characteristic weights 316 may be automatically determined based on the total scores 218 as described above with reference to matrix 200.

Figure 6:
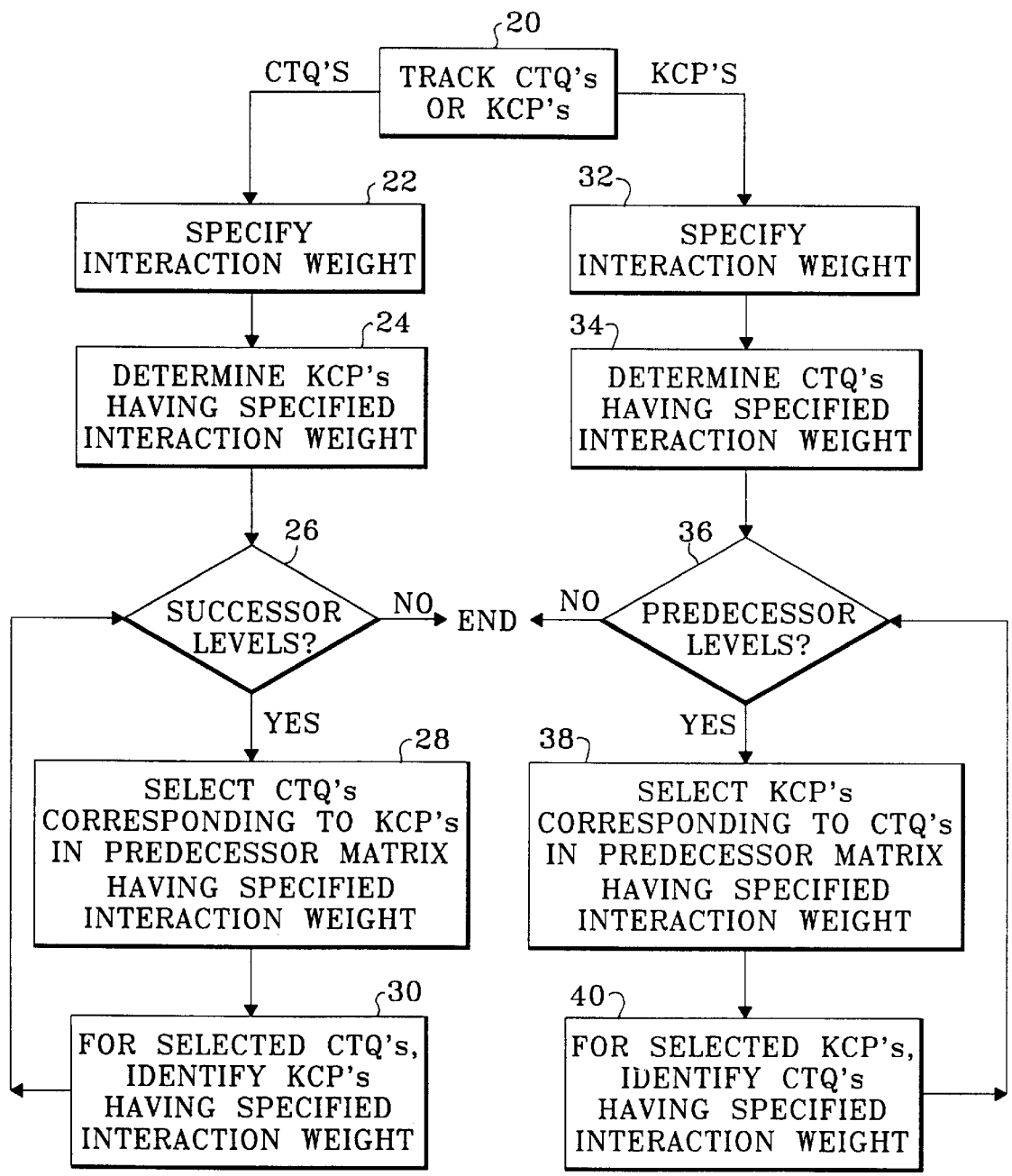
FIG. 6 is a flowchart of the process of tracking critical to quality characteristics or key control parameters.

The hierarchical relationship between the quality matrices and the use of key control parameters from a prior matrix as the critical to quality characteristics in a subsequent matrix allows for tracking of critical to quality characteristics or key control parameters having a specified level of interaction. FIG. 6 is a flow chart of an exemplary process for tracking critical to quality characteristics or key control parameters having a specified level of interaction. At step 20, the user is queried whether they wish to track critical to quality characteristics (CTQ's) or key control parameters (KCP's). If the user selects critical to quality characteristics, flow proceeds to step 22 where the user defines the level of interaction weight to be tracked. For example, the user may desire locating all critical to quality characteristics having high interaction weights with key control parameters. The user may also designate a single critical to quality characteristic (e.g., y1) and track key control parameters having the desired interaction weight. At step 24, the key control parameters having the desired interaction weight (e.g., high) are detected and displayed to the user as described herein. At step 26, the process determines if there exists any successor levels. If not, the process ends. If so, at step 28 the process examines the successor matrix and selects critical to quality characteristics corresponding to the key control parameters having the specified level of interaction in the previous matrix. As described above, the key control parameters from a predecessor level are used as the critical to quality characteristics in a successor level. At step 30, the critical to quality characteristics selected at step 28 are examined for key control parameters having the desired interaction weight. Flow proceeds to step 26 and the process continues until all the levels of matrices have been processed.

If at step 20, the user selects to track key control parameters, flow proceeds to step 32. The process for tracking key control parameters is similar to that of tracking critical to quality characteristics but it is performed from low levels to high levels. At step 32, the user defines the level of interaction weight to be tracked. For example, the user may desire locating all key control parameters having high interaction weights with critical to quality characteristics. At step 34, the critical to quality characteristics having the desired interaction weight (e.g., high) are detected and displayed to the user as described herein. At step 36, the process determines if there exists any predecessor levels. If not, the process ends. If so, at step 38 the process examines the predecessor matrix and selects key control parameters corresponding to the critical to quality characteristics having the specified level of interaction in the previous matrix. As described above, the critical to quality characteristics from a successor level are the key control parameters in a predecessor level. At step 40, the key control parameters selected at step 38 are examined for critical to quality characteristics having the desired interaction weight. Flow proceeds to step 36 and the process continues until all the levels of matrices have been processed.

FIG. 5 illustrates the process of tracking critical to quality characteristics having a high interaction weight with key control parameter y2. As shown in the market data matrix, critical to quality characteristic y2 has a high interaction weight with key control parameter x8. Both row y2 and column x8 are highlighted in color as shown by the cross-hatching in FIG. 5. Moving to the successor design matrix, critical to quality characteristic x8 is examined and key control parameters df4, df5, and df6 are found to have a high interaction weight with critical to quality characteristic x8. Row x8 and columns df4, df5, and df6 are highlighted in color as shown by the cross-hatching. Moving to the design matrix, critical to quality characteristics df4, df5 and df6 are examined and key control parameters mp1 and mp3 are found to have a high interaction weight with critical to quality characteristics df4, df5, and df6. Rows df4, df5 and df6 and columns mp1 and mp3 are highlighted in color as shown by cross-hatching. By highlighting rows and columns where the desired interaction weight is found, the user is presented with an easily readable format for determining the relationship between critical to quality characteristics and key control parameters across multiple levels. The information from the highlighted rows and columns may then be extracted to a partitioned QFD to highlight the significant aspects of the QFD. The relative scores may change in performing the extraction because some interactions will be omitted.

The present invention can be embodied in the form of computer implemented processes and apparatuses for practicing those processes. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as an exemplary mode contemplated for carrying out this invention, but that the invention will include all embodiments falling within the scope of the appended claims.

What is claimed is:

1. A method of generating quality matrices indicating a relationship between critical to quality characteristics and key control parameters for levels of a process, the method comprising:
    designating a plurality of rows of a first matrix as critical to quality characteristics;
    designating a plurality of columns of the first matrix as key control parameters;
    assigning each critical to quality characteristic a critical to quality weight;
    assigning an interaction weight between at least one critical to quality characteristic and at least one key control parameter; and
    generating a score for at least one key control parameter in response to said critical to quality weight and said interaction weight.

2. The method of claim 1 further comprising:
    displaying said score.

3. The method of claim 2 wherein said displaying said score displays said score graphically.

4. The method of claim 1 further comprising:
    generating a second matrix for a second level of the process in response to said first matrix.

5. The method of claim 4 further comprising:
    using the key control parameters from said first matrix as critical to quality characteristics in said second matrix.

6. The method of claim 4 further comprising:
    locating critical to quality characteristics and key control parameters having a predetermined interaction weight; and
    displaying said critical to quality characteristics and key control parameters having said predetermined interaction weight to a user.

7. The method of claim 6 further comprising:
    locating in said first matrix key control parameters having the predetermined interaction weight with critical to quality characteristics;
    selecting in said second matrix critical to quality characteristics corresponding to the key control parameters having the predetermined interaction weight with critical to quality characteristics in said first matrix; and
    locating, for said selected critical to quality characteristics in said second matrix, key control parameters having the predetermined interaction weight.

8. The method of claim 6 further comprising:
    locating in said second matrix critical to quality characteristics having the predetermined interaction weight with key control parameters;
    selecting in said first matrix key control parameters corresponding to the critical to quality characteristics having the predetermined interaction weight with key control parameters in said second matrix; and
    locating, for said selected key control parameters in said first matrix, critical to quality characteristics having the predetermined interaction weight.

9. The method of claim 6 wherein:
    said displaying comprises highlighting rows and columns in which said critical to quality characteristics and key control parameters having a predetermined interaction weight.

10. A storage medium encoded with machine-readable computer program code for generating quality matrices indicating a relationship between critical to quality characteristics and key control parameters for levels of a process, the program code causing a computer to implement a method of:
    designating a plurality of rows of a first matrix as critical to quality characteristics;
    designating a plurality of columns of the first matrix as key control parameters;
    assigning each critical to quality characteristic a critical to quality weight;
    assigning an interaction weight between at least one critical to quality characteristic and at least one key control parameter; and
    generating a score for at least one key control parameter in response to said critical to quality weight and said interaction weight.

11. The storage medium of claim 10 further comprising program code causing the computer to implement:
    displaying said score.

12. The storage medium of claim 11 wherein said displaying said score displays said score graphically.

13. The storage medium of claim 10 further comprising program code causing the computer to implement:
    generating a second matrix for a second level of the process in response to said first matrix.

14. The storage medium of claim 13 further comprising program code causing the computer to implement:
    using the key control parameters from said first matrix as critical to quality characteristics in said second matrix.

15. The storage medium of claim 13 further comprising program code causing the computer to implement:

locating critical to quality characteristics and key control parameters having a predetermined interaction weight; and displaying said critical to quality characteristics and key control parameters having said predetermined interaction weight to a user.

16. The storage medium of claim 15 further comprising program code causing the computer to implement:

locating in said first matrix key control parameters having the predetermined interaction weight with critical to quality characteristics;

selecting in said second matrix critical to quality characteristics corresponding to the key control parameters having the predetermined interaction weight with critical to quality characteristics in said first matrix; and locating, for said selected critical to quality characteristics in said second matrix, key control parameters having the predetermined interaction weight.

17. The storage medium of claim 15 further comprising program code causing the computer to implement:

locating in said second matrix critical to quality characteristics having the predetermined interaction weight with key control parameters;

selecting in said first matrix key control parameters corresponding to the critical to quality characteristics having the predetermined interaction weight with key control parameters in said second matrix; and locating, for said selected key control parameters in said first matrix, critical to quality characteristics having the predetermined interaction weight.

18. The storage medium of claim 15 wherein:

said displaying comprises highlighting rows and columns in which said critical to quality characteristics and key control parameters having a predetermined interaction weight.

* * * * *